United States Patent
Veprinsky et al.

(10) Patent No.: US 10,031,675 B1
(45) Date of Patent: Jul. 24, 2018

(54) METHOD AND SYSTEM FOR TIERING DATA

(71) Applicant: EMC Corporation, Hopkinton, MA (US)

(72) Inventors: Alexandr Veprinsky, Brookline, MA (US); Assaf Natanzon, Tel Aviv (IL)

(73) Assignee: EMC Corporation, Hopkinton, MA (US)

(*) Notice: Subject to any disclaimer, the term of this patent is extended or adjusted under 35 U.S.C. 154(b) by 12 days.

(21) Appl. No.: 15/086,582

(22) Filed: Mar. 31, 2016

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC .......... *G06F 3/0611* (2013.01); *G06F 3/0659* (2013.01); *G06F 3/0688* (2013.01)

(58) Field of Classification Search
CPC . G06F 3/00; G06F 3/06; G06F 3/0601; G06F 3/0602; G06F 3/0604; G06F 3/061; G06F 3/0611–3/0619; G06F 3/0646–3/0659; G06F 3/0668–3/0688; G06F 3/0689; G06F 17/00; G06F 17/30; G06F 17/30067; G06F 17/30073; G06F 17/30129–17/30179; G06F 17/30182; G06F 17/30221; G06F 2003/0691–2003/0698
See application file for complete search history.

(56) References Cited

U.S. PATENT DOCUMENTS

| | | | |
|---|---|---|---|
| 6,272,605 B1* | 8/2001 | Le | G06F 3/0617 709/213 |
| 6,279,074 B1* | 8/2001 | Pence | G06F 3/0607 711/112 |
| 7,769,722 B1* | 8/2010 | Bergant | G06F 11/2097 707/681 |
| 8,473,678 B1* | 6/2013 | Rajasekaran | G06F 3/0605 711/114 |
| 8,683,153 B1* | 3/2014 | Long | G06F 3/0608 711/112 |
| 8,966,164 B1* | 2/2015 | Asnaashari | G06F 12/0246 711/103 |
| 8,984,027 B1* | 3/2015 | Patwardhan | G06F 17/30079 707/809 |
| 9,436,392 B1* | 9/2016 | Shetty | G06F 3/0613 |
| 9,483,187 B2* | 11/2016 | Karaje | G06F 3/061 |

(Continued)

FOREIGN PATENT DOCUMENTS

WO  WO 2015154352 A1 * 10/2015  ....... G06F 17/30079

OTHER PUBLICATIONS

Machine translation of WO2015154352A1 (6 pages) (Year: 2015).*

(Continued)

*Primary Examiner* — Daniel C Chappell
(74) *Attorney, Agent, or Firm* — Krishnendu Gupta

(57) ABSTRACT

Example embodiments of the present invention relate to a method, a system, and a computer program product for data storage tiering. The method includes maintaining data in a data storage system having a plurality of tiers, determining a subset of the data stored in a first, more-durable tier should be stored in a second, less-durable tier, and tiering the subset of the data from the first, more-durable tier to the second, less-durable tier.

19 Claims, 8 Drawing Sheets

(56) References Cited

U.S. PATENT DOCUMENTS

| | | | | |
|---|---|---|---|---|
| 9,489,141 | B2* | 11/2016 | Nanduri | G06F 3/061 |
| 9,778,885 | B2* | 10/2017 | Danilak | G06F 3/0688 |
| 9,792,047 | B2* | 10/2017 | Asnaashari | G06F 3/061 |
| 9,792,073 | B2* | 10/2017 | Asnaashari | G06F 3/0688 |
| 2003/0065683 | A1* | 4/2003 | Beeston | G06F 3/0607 |
| 2003/0065882 | A1* | 4/2003 | Beeston | G06F 3/0613 711/111 |
| 2003/0065903 | A1* | 4/2003 | Ashton | G06F 3/0601 711/172 |
| 2005/0165796 | A1* | 7/2005 | Moore | G06F 17/3028 |
| 2011/0078398 | A1* | 3/2011 | Jess | G06F 3/061 711/162 |
| 2011/0153965 | A1* | 6/2011 | Haustein | G06F 3/0614 711/162 |
| 2011/0197046 | A1* | 8/2011 | Chiu | G06F 3/0617 711/171 |
| 2013/0124787 | A1* | 5/2013 | Schuette | G06F 12/0246 711/103 |
| 2014/0114933 | A1* | 4/2014 | Chandrasekarasastry | G06F 12/02 707/692 |
| 2014/0358871 | A1* | 12/2014 | Cideciyan | G06F 17/30156 707/692 |
| 2015/0317090 | A1* | 11/2015 | Samanta | G06F 3/0635 711/103 |
| 2016/0077988 | A1* | 3/2016 | Tipton | G06F 13/28 710/308 |

OTHER PUBLICATIONS

Purity: Building Fast, Highly-Available Enterprise Flash Storage from Commodity Components; Colgrove et al; Proceedings of the 2015 ACM SIGMOD International Conference on Management of Data; May 31, 2015-Jun. 4, 2015; pp. 1683-1694 (12 pages) (Year: 2015).*

H-NVMe: A hybrid framework of NVMe-based storage system in cloud computing environment; Yang et al; 36th International Performance Computing and Communications Conference; Dec. 2010-Dec. 2017 (8 pages) (Year: 2017).*

AutoTiering: Automatic data placement manager in multi-tier all-flash datacenter; Yang et al; 36th International Performance Computing and Communications Conference; Dec. 2010-Dec. 2017 (8 pages) (Year: 2017).*

* cited by examiner

MAPPING TABLE
200

| LBA OFFSET (ADDRESS) | FINGERPRINT (HASH) | PHY. LOC. | REF. CNT |
|---|---|---|---|
| 0 | 20147A8 | 40 | 1 |
| 1 | AB45CB7 | 8 | 1 |
| 2 | F3AFBA3 | 88 | 1 |
| 3 | 963FE7B | 24 | 2 |
| 4 | 0325F7A | 64 | 1 |
| 5 | 134F871 | 128 | 1 |
| 6 | CA38C90 | 516 | 1 |
| 7 | 963FE7B | 24 | |

| FINGERPRINT (HASH) | T LAST WRITE |
|---|---|
| 20147A8 | $T_0$ |
| AB45CB7 | $T_1$ |
| F3AFBA3 | $T_2$ |
| 963FE7B | $T_7$ ($\bcancel{T_3}$) |
| 0325F7A | $T_4$ |
| 134F871 | $T_5$ |
| CA38C90 | $T_6$ |

| BLOCK RANGES | T LAST WRITE |
|---|---|
| 0-255 | $T_0$ |
| 256-511 | $T_1$ |
| 512-767 | $T_2$ |
| 768-1023 | $T_7$ ($\bcancel{T_3}$) |
| 1024-1279 | $T_4$ |
| 1280-1535 | $T_5$ |
| 1536-1791 | $T_6$ |

FIG. 3B

METHOD AND SYSTEM FOR TIERING DATA

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This Application is related to U.S. patent application Ser. No. 14/985,735 entitled "METHOD AND SYSTEM FOR TIERING DATA" filed on Dec. 31, 2015 and assigned to EMC Corporation of Hopkinton, Mass., the teachings of which applications are hereby incorporated herein by reference in their entirety.

TECHNICAL FIELD

This application relates to data storage and, more particularly, to data storage tiering.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

Example embodiments of the present invention relate to a method, a system, and a computer program product for data storage tiering. The method includes maintaining data in a data storage system having a plurality of tiers, determining a subset of the data stored in a first, more-durable tier should be stored in a second, less-durable tier, and tiering the subset of the data from the first, more-durable tier to the second, less-durable tier.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 2 is an illustration of a mapping table including count indicative of how many addresses point to a hash according to an example embodiment of the present invention;

FIGS. 3A-3B are illustrations of metadata tables including last write times for addresses and ranges, respectively, according to an example embodiment of the present invention;

DETAILED DESCRIPTION

Figure 1:
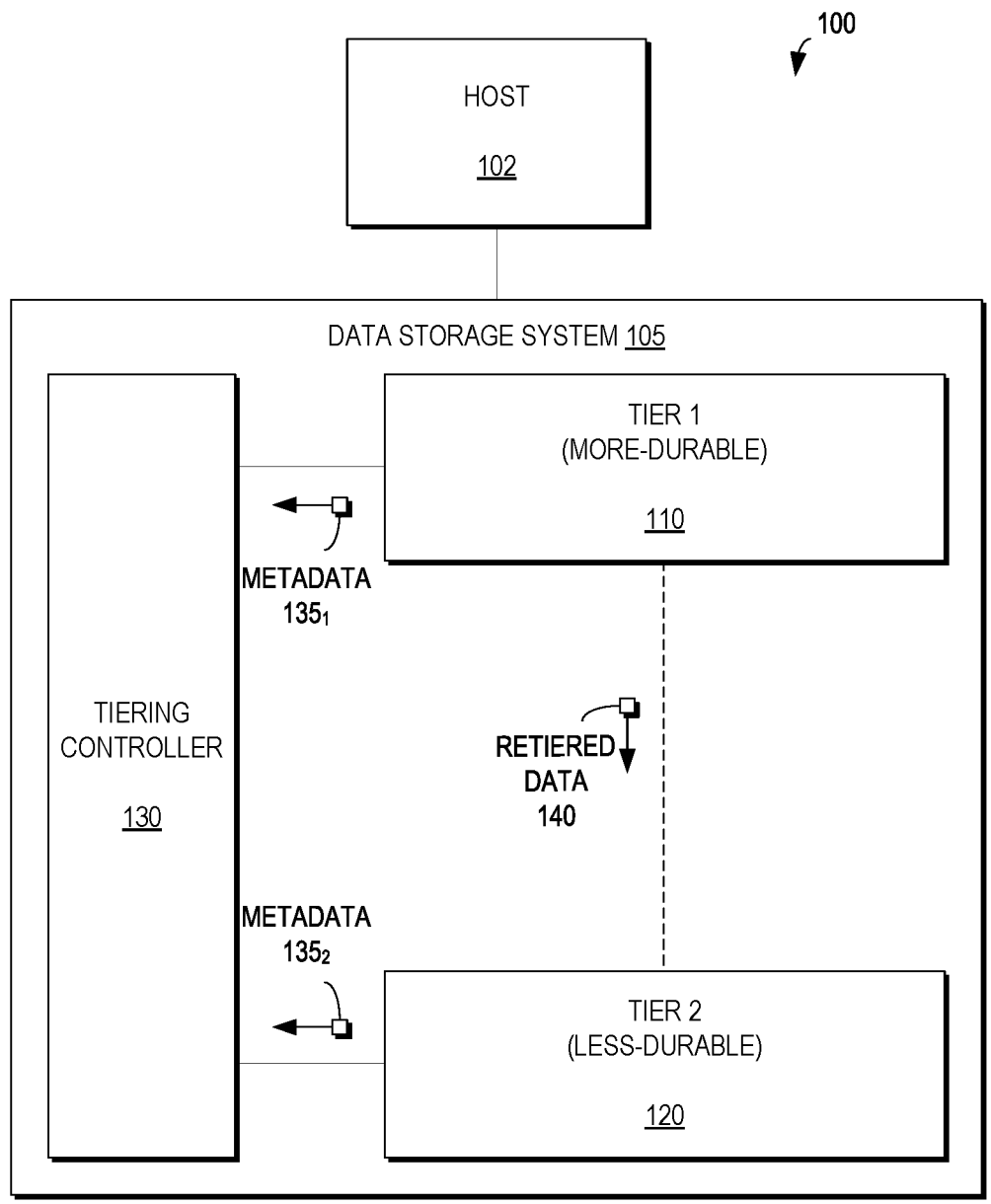
FIG. 1 is a block diagram illustrating a system for tiering data from a first, more-durable tier to a second, less-durable tier according to an example embodiment of the present invention.

Typically, the general idea behind tiering is to move data according to its value or another metric to different types of storage (e.g., cheaper or more expensive storage). Traditionally, more valuable data is stored on more expensive storage devices. For example, typical data storage tiering systems put data accessed frequently on a higher tier (e.g., high performance, high cost) and data accessed rarely on a lower tier (e.g., low performance, low cost). However, example embodiments of the present invention take the opposite approach and store more valuable data on a lower tier (e.g., low-durability).

Typically, Flash storage devices have different characteristics. For example, cheaper Flash storage devices tend to have lower write durability, and reads are impacted by writes so it is not desirable to repeatedly write to them. In other words, due to the characteristics of cheaper Flash storage devices, it is advantageous to write the data and leave it there for a long period of time. Therefore, more valuable data that will tend to reside on storage for a long time should be stored on cheaper Flash storage devices.

The main difference between different Flash storage devices is their write durability. For implementing an I/O intensive product one uses higher durability expensive disks since data is being removed and overwritten frequently. Example embodiments of the present invention recognize that, in many cases, data that is destined to remain longer in the system can be saved on a cheaper Flash storage device, resulting in significant cost savings to customers and the ability to have larger capacity and cheaper storage arrays.

Example embodiments of the present invention leverage a deduplicated storage array (e.g., EMC® XtremIO® by EMC Corporation of Hopkinton, Mass.) to do tiering between two levels of storage devices. As described in U.S. patent application Ser. No. 14/751,652 entitled "TIERING DATA BETWEEN TWO DEDUPLICATION DEVICES" filed on Jun. 26, 2015 and assigned to EMC Corporation of Hopkinton, Mass., the teachings of which applications are hereby incorporated herein by reference in their entirety, in certain embodiments a storage system may save each block of data according to a hash. In one particular example, the blocks of data are 8 KB in size. In one particular example, a hash includes a Secure Hash Algorithm 1 (SHA-1) hash. In one example, the storage system may be a deduplicated storage array so that each of the data in the data storage system may be kept in separate levels.

Accordingly, in such examples, in a first level, each volume may include a set of pointers from address-to-hash value of the data address (e.g., in an address-to-hash (A2H) mapping). Further, in such examples, a second level of mapping includes, for example, a map from hash-to-the physical location (e.g., in a hash-to-physical (H2P) mapping) where the data matching the hash value is stored. In some examples, A2H mappings and H2P mappings may each be maintained using one or more tables. It will be appreciated that, in certain embodiments, combinations of the A2H and H2P tables may provide multiple levels of indirection between the logical (i.e., I/O) address used to access data and the physical address where that data is stored. Among other advantages, this may allow the primary storage system 210 freedom to move data within the storage (i.e., physical storage media (e.g., disks, solid state drives (SSDs), etc.). In certain embodiments, if a hash value is no longer in use, the physical location will be freed and later overwritten.

Figure 6:
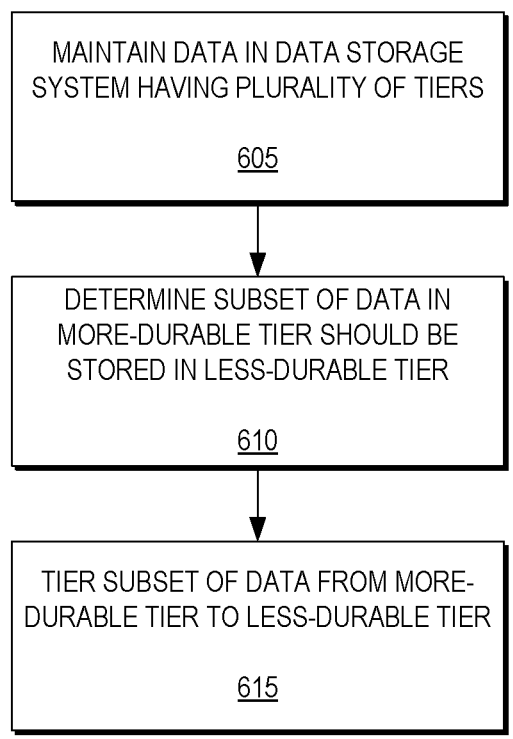
FIG. 6 is a flow diagram illustrating a method for tiering data from a first, more-durable tier to a second, less-durable tier according to an example embodiment of the present invention.

FIG. 1 is a block diagram illustrating a system 100, including a host 102 and a data storage system 105, for tiering data 140 from a first, more-durable tier 110 to a second, less-durable tier 120 according to an example embodiment of the present invention. FIG. 6 is a flow diagram illustrating a method for tiering data from a first, more-durable tier to a second, less-durable tier according to an example embodiment of the present invention. FIGS. 1 and 6 may be described in conjunction.

For example, consider a storage array, such as EMC XtremIO all Flash storage array by EMC Corporation of Hopkinton, Mass., that consists of a cluster of compute nodes, where each node is responsible for a portion of the compute power, and Flash storage devices. Further, consider a back-end service that constitutes a key/value service where the key uniquely identifies values. Values can be small blocks of data, for example 4 kb pages, and keys are much smaller, for example a few bytes. Example embodiments of the present invention provide methods for data tiering in this system between the first, more-durable tier 110 and the second, less-durable tier 120.

According to certain embodiments, the data storage system 105 may automatically reduce (i.e., deduplicate and compress) data as it enters the system, processing it in data blocks. In a preferred embodiment, deduplication is global (i.e., over the entire system), is always on, and is performed in real-time (i.e., never as a postprocessing operation). After the deduplication, the data may be compressed inline, before it is written to Flash storage devices. In example embodiments, the data storage system 105 uses a global memory cache, which is aware of the deduplicated data, and content-based distribution that inherently spreads the data evenly across the entire data storage system 105.

For highly duplicated data, which is typical of many virtualized cloned environments, such as Virtual Desktop Integration (VDI), the effective usable capacity in example embodiments of the present invention is much higher than the available physical Flash storage device capacity. For example, deduplication ratios in the range of 5:1 to 10:1 are routinely achieved in such environments. For compressible data, which is typical in many databases and in application data, compression ratios are in 2:1 to 3:1 range. Therefore, example embodiment systems may benefit from both data compression and data deduplication and may achieve a ratio range of 10:1 to 30:1.

As illustrated in FIGS. 1 and 6, a tiering controller 130 may maintain data in the data storage system 105 having a plurality of tiers (e.g., a more-durable first tier 110 and a less-durable second tier 120) (605). The tiering controller 130 may determine a subset 140 of the data stored in a first, more-durable tier 110 should be stored in a second, less-durable tier 120 (610). The tiering controller 130 then may tier the subset of the data 140 from the first, more-durable tier 110 to the second, less-durable tier 120 (615).

In certain embodiments, the second, less-durable tier 120 may be comprised of less expensive Flash storage devices. Such lower cost Flash storage devices may have a lower write durability than higher cost Flash storage devices. In other words, the number of times to which an address in a Flash storage device may be written in the second, less-durable tier 120 before failure is much lower. For example, in a first, more-durable tier 110, the Flash storage devices may be able to write 1000 times to an address before a failure occurs, while in a second, less-durable tier 120 failure of the Flash storage devices may be expected after 10 writes. In general, less-durable Flash storage devices are much less expensive than more-durable Flash storage devices.

Therefore, example embodiments of the present invention may tier the subset of the data from the first, more-durable tier 110 having a greater write durability to the second, less-durable tier 120 having a lower write durability. Accordingly, as will be described in greater detail below, although the Flash storage devices in the first tier 110 and the second tier 120 may have similar read performance and, possibly, write performance, the Flash storage devices in the second tier 120 may be less-durable (and, therefore, less expensive) than the Flash storage devices in the first tier 110 and example embodiments of the present invention may store (e.g., retier) data to the second, less-durable tier 120 that will minimize write operations to the less-durable Flash storage devices in the second tier 120.

As described above, typical tiering systems move the "important" data to the higher tier. However, example embodiments of the present invention move the data that is "important" (i.e., unlikely to be deleted) to a second, less-durable tier 120. For example, example embodiments of the present invention may move pages with high reference count (e.g., a high deduplication value) to the second, less-durable tier 120 as they are unlikely to ever be deleted. Therefore, according to example embodiments of the present invention, the second, less-durable tier 120 is comprised mostly of pages that are written once and never rewritten. This paradigm aligns perfectly with the properties described above of the Flash storage devices in the second, less-durable tier 120—same performance and lower cost, but with a lower write durability.

Example embodiments of the present invention may determine the subset of the data stored in the first, more-durable tier 110 to be stored in the second, less-durable tier 120 by determining metadata $135_1$ of the subset of the data stored in the first, more-durable tier 110 is indicative of a high operational value of the subset of the data. For example, as will be described in greater detail below with respect to FIGS. 3 and 4, respectively, the tiering controller 130 may examine deduplication ratios or fragmentation of the data in order to determine the subset of the data for retiering from the first, more-durable tier 110 to the second, less-durable tier 120.

In certain embodiments, retiering data may include moving data from a first, more-durable tier 110 of a data storage system 105 to a second, less-durable 105 tier of a data storage system 105. In other embodiments, retiering data may include redirecting a write operation directed to a first, more-durable tier 110 to a second, less-durable tier 120 to effectuate the relocation of the retired data without incurring an unnecessary read operation to read the data from the first tier.

In certain embodiments, the fragmentation value of a page of data indicates how empty the stripe is in which the data resides. Accordingly, a page that is in an almost empty stripe of the first, more-durable tier 110 has high fragmentation value and may be a candidate to move to a second, less-durable tier 120 in certain embodiments. It should be understood that fragmentation, in this context, does not necessarily refer to a number of discontiguous pieces of data (i.e., pages or groups of pages) written to a stripe but rather to the fullness of the stripe to which the data is written. For example, if every other page is missing in the stripe, while this may look highly fragmented in the traditional sense to a disk defragmentation utility, in example embodiments of the present invention, the page is in a half-full stripe which has a low fragmentation value.

In example embodiments of the present invention, however, write I/Os are performed to retier 140 page from the first, more-durable tier 110 to the second, less-durable tier 120 and the performance of read I/Os to the second, less-durable tier 120 may be impacted by those write I/Os. However, because example embodiments of the present invention retier data at rest, it is possible to throttle the retiering of the data 140 from the first, more-durable tier 110 to the second, less-durable tier 120 in favor of the read I/Os to the second, less-durable tier 120. For example, the tiering controller 130 may monitor a utilization of the data storage system 105 associated with read I/Os to the second, less-durable tier 120 and balance an allocation of data storage system resources across servicing the read I/Os by the second, less-durable tier 120 and the tiering of the subset of the data from the first, more-durable tier 110 to the second, less-durable tier 120. Other example embodiments may provide modified firmware at the Flash storage devices of the second, less-durable tier 120 to prioritize reads I/Os over writes. Although such prioritization, in example embodiments, may negatively impact latency of the retiering process, the retiering process of data at rest is not a mission critical process in the data storage system 105.

FIG. 2 is an illustration of a mapping table 200 according to an example embodiment of the present invention. As described below, example embodiments of the present invention may determine the subset of data to be retired from the first, more-durable tier 110 to the second, less-durable tier 120 according to metadata of the data stored at the first, more-durable tier 110, including a deduplication ratio of the data.

As illustrated in FIG. 2, according to an example embodiment of the present invention, the data storage system 105 may include a plurality of volumes (not shown) with each volume having a mapping table 200 of addresses (i.e., LBA offset) each pointing to page of data (i.e., physical location). The mapping table 200 also maintains for each page of data a count indicative of how many addresses point to it.

The mapping table 200 manages the location of each data block on Flash storage devices. As illustrated, the table has two parts: (1) a map of the host LBA (i.e., address) to its content fingerprint (i.e., hash); and (2) a map of the content fingerprint (i.e., hash) to its location on the Flash storage device (i.e., physical local). Using the second part of the table 300 provides example embodiments of the present invention with the unique capability to distribute the data evenly across the data storage system 105 and place each block in the most suitable location on Flash storage devices. It also enables the data storage system 105 to skip a non-responding storage device or to select where to write new blocks when the array is almost full and there are no empty stripes to write to.

In a typical write operation, the incoming data stream is broken into data blocks and, for every data block, the data storage system 105 fingerprints the data with a unique identifier. The data storage system 105 maintains a table with this fingerprint in the mapping table 200 to determine if subsequent incoming writes already exist within the data storage system 105. As described above, the fingerprint is also used to determine the storage location of the data. The data storage system 105 checks if the fingerprint and the corresponding data block have already been stored previously. If the fingerprint is new (e.g., for LBA 0-6), the system 105 may compress the data, choose a location on the array where the block will go (i.e., based on the fingerprint, and not the LBA), create the fingerprint to physical location mapping, and increment the reference count for the fingerprint by one.

As illustrated in FIG. 2, LBA 3 and LBA 7 both have the same fingerprint, 963FE7B, and therefore LBA 7 is duplicated. In case of a "duplicate" write (e.g., as illustrated in FIG. 3, LBA 7 is a "duplicate" of LBA 3 which is already written), the data storage system 105 records the new LBA to fingerprint mapping (e.g., LBA 7→963FE7B), and increments the reference count on this specific fingerprint (i.e., increment the reference count for fingerprint 963FE7B associated with LBA 3 from 1 (not shown) to 2). Since the data already exists in the data storage system 105, it is neither necessary to change the fingerprint to physical location mapping nor to write anything to the Flash storage devices. In a preferred embodiment, all metadata changes occur within the memory. Therefore, the deduplicated write may be carried out faster than the first unique block write.

In example embodiments of the present invention, the deduplication ratio of data may be indicative of the value of that data. For example, if there are a lot of addresses pointing to a specific page of data such that the page of data has a high deduplication ratio (i.e., the number of times a specific page of data is referenced in data volumes), the associated probability of erasing that data is very low because there are many references to the data. In other words, once a page reaches a high deduplication ratio it will probably not be deleted from the data storage system 105 because there are multiple copies of this data in various logical locations. Therefore, the data has some inherent value and should be retired from the first, more-durable tier 110 to the second, less-durable tier 120.

In this case, when we receive a write and the duplication ratio of a certain hash reaches, for example, a pre-defined threshold, example embodiments of the present invention may retier the data to the lower, less-durable tier 120. In certain embodiments, this latest received write I/O may be used to "retier" the data (i.e., as opposed to performing an unnecessary read I/O from the first, more-durable tier 110). In other words, the tiering controller 130 need not perform an additional read because the data storage system 105 received a new copy of the data which may be queued at the second, less-durable tier 120 for destaging.

FIGS. 3A-3B are illustrations of metadata tables 300A, 300B including last write times for addresses and block ranges, respectively, according to an example embodiment of the present invention. In certain embodiments, time values (e.g., relative or absolute) may be provided associated with the last time data was written for a hash.

Referring to FIG. 3A, last write times may be maintained per hash (e.g., 4 kb, 8 kb). For example, suppose addresses 0 through 7 in the mapping table of FIG. 2 were written time sequentially from time $T_0$ to time $T_7$. Therefore, as illustrated in FIG. 3A, hash 20147A8 was written to at time $T_0$, hash AB45CB7 was written to at time $T_1$, hash F3AFBA3 was written to at time $T_2$, hash 963FE7B was written to at time $T_7$ (updated from a value of $T_3$), hash 0325F7A was written to at time $T_4$, hash 134F871 was written to at time $T_5$, and hash CA38C90 was written to at time $T_6$.

Likewise, referring to FIG. 3B, last write times may be maintained for a portion of a volume (e.g., 1 MB or 1024 KB in 256 blocks at 4 KB each). For example, suppose block range 0-255 was written to at time $T_0$, block range 256-511 was written to at time $T_1$, block range 512-767 was written to at time $T_2$, block range 768-1023 was written to at time $T_3$, block range 1024-1279 was written to at time $T_4$, block range 1280-1535 was written to at time $T_5$, block range 1536-1791 was written to at time $T_6$, and block range 768-1023 was written to at time $T_7$ (updated from a value of $T_3$).

Thus, referring to both FIGS. 3A and 3B, if an address or block range has not changed within a defined period of time, the data may be tiered to the lower tier of storage. Accordingly, example embodiments of the present invention may periodically look at last write time metadata to determine volume areas (i.e., blocks and block ranges) not overwritten in a last period and retier data that is stored on the higher, more expensive tier to the lower, less expensive tier.

Figure 4:
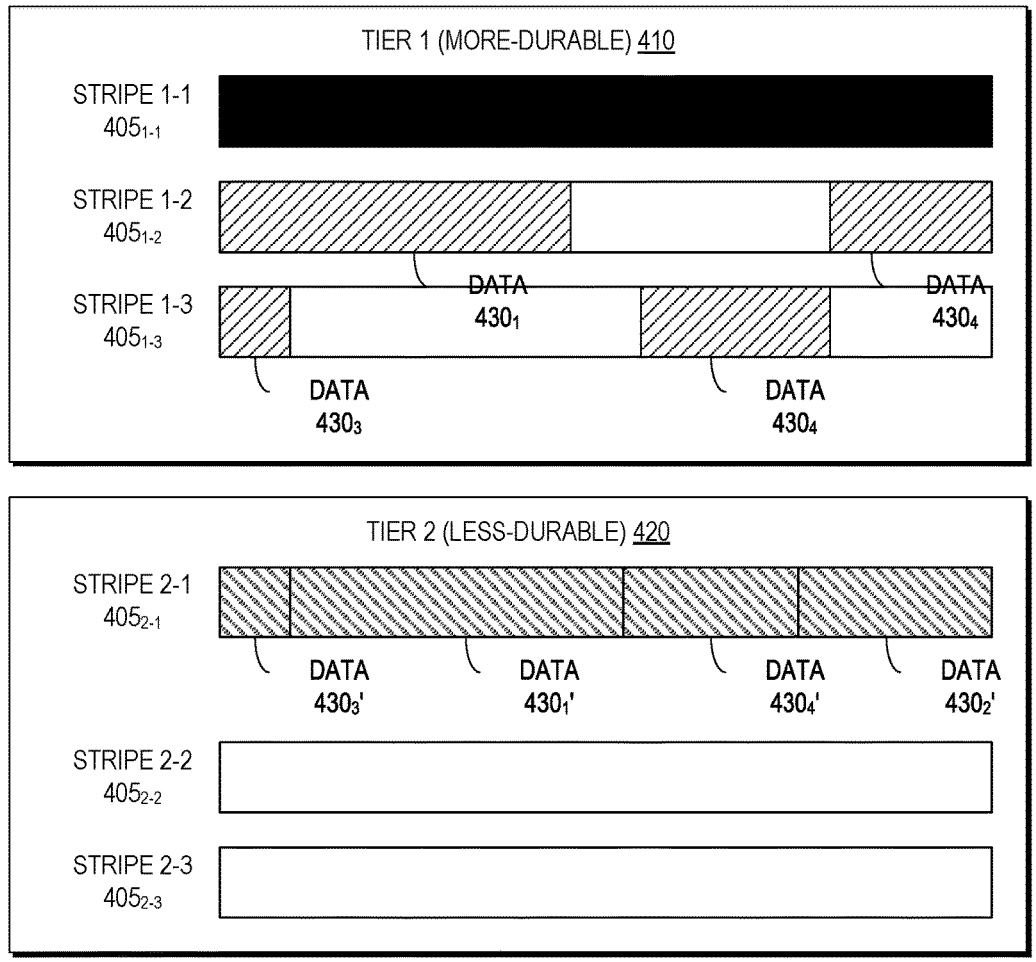
FIG. 4 is a block diagram illustrating a plurality of stripes in a first, more-durable tier having respective levels of fullness according to an example embodiment of the present invention.

FIG. 4 is a block diagram illustrating a first plurality of stripes 405$_{1-1}$, 405$_{1-2}$, 405$_{1-3}$ in a first, more-durable tier 410 and a second plurality of stripes 405$_{2-1}$, 405$_{2-2}$, 405$_{2-3}$ in a second, less-durable tier 420 (405 generally) having respective levels of fullness according to an example embodiment of the present invention.

In an example embodiment, each page may be 4 KB, with each stripe composed of N pages of data and K pages of parity (consuming a total of 4*(N+K) KB of Flash storage). These stripes may be referred to as "S-stripes" with this as the first level "1-stripes". For compression purposes, example embodiments of the present invention allow these 1-stripes to be split into variable size sub-stripes, where the width of a sub-stripe divides the page size. For example, a 2-stripe may include 2N+2K sub-pages of 4 KB. This can be done by taking normal stripes and splitting them horizontally, resulting in twice as many 2 KB sub-pages. Similarly, a 4-stripe includes 4N+4K sub-pages of 2 KB. Notice that all S-stripes (where S=1, 2, 4) consume the same amount of Flash storage. Each page then may be tested for compressibility and given a score of, for example, 1, 2, 4, etc. and is written to the top level storage tier (i.e., the most durable Flash disk, here the first, more-durable tier 110).

Since a pre-defined division for S-stripes would not work since we are not sure a priori of the number of pages having different compression scores. Therefore one may be tempted to use a greedy algorithm (i.e., having all the stripes defined as unassigned and finding the emptiest stripes of our type and writing to the pages we currently have free, or if we don't find one picking an unassigned stripe and assigning it to the needed type).

However, consider an example embodiment in which all data written to the array has a score of 4 (i.e., we have all the stripes assigned as 2K stripes and the stripes are full). Once the array is full, half of the data is deleted in such a pattern that only the odd physical addresses become free. In this situation (i.e., on one hand, the array is 50% free; on the other hand, we will not be able to write even a single uncompressible page because there isn't a single, continuous available page of length 4K).

Example embodiments of the preset invention address this issue by a background defragmentation process that continuously takes the emptiest stripes of each compression level and consolidates as many of these stripes into one full stripe. The freed up stripes then may be returned to a pool of unassigned top tier stripes, where they will be able to be assigned to any other type. Additionally, as understood in the art, the defragmentation process addresses challenges prevented by flash storage wherein smart portions of data (e.g., 4 kb, 8 kb) cannot be erased but rather larger portions of data must be erased at once.

Example embodiments of the present invention recognize that empty stripes tend to have oldest pages as the neighbors of the pages currently residing in the stripe have previously been moved and the remaining pages likely will remain for a longer time. Therefore a second metric to examine to determine which data should be moved from the first, more-durable tier 410 to a second, less-durable tier 420 is to determine pages that are in stripes that are almost empty and move these pages to second, less-durable tier.

As illustrated in FIG. 4, example embodiments of the present invention may include a similar set of stripes for the second, less-durable tier 420 to move to these stripes the pages that likely will stay for a longer time span in the data storage system thereby resulting in a lower number of writes to these Flash storage devices. In a preferred embodiment, the stripes will have same compression levels as the stripes in the first, more-durable tier.

Accordingly, in an example embodiment of the present invention, the defragmentation process takes more empty stripes 405 in the first, more-durable tier 410 of a data storage system (e.g., stripe 1-2 405$_{1-2}$ and stripe 1-3 405$_{1-3}$) and puts them together into more full stripes in the second, less-durable tier 420 of the data storage system (e.g., stripe 2-1 405$_{2-1}$) to free full stripes in the first, more-durable tier 410. It should be noted that, in an embodiment that includes an existing defragmentation process, no new processes are introduced to the system nor is additional metadata necessary to determine what "old" data is.

Figure 5:
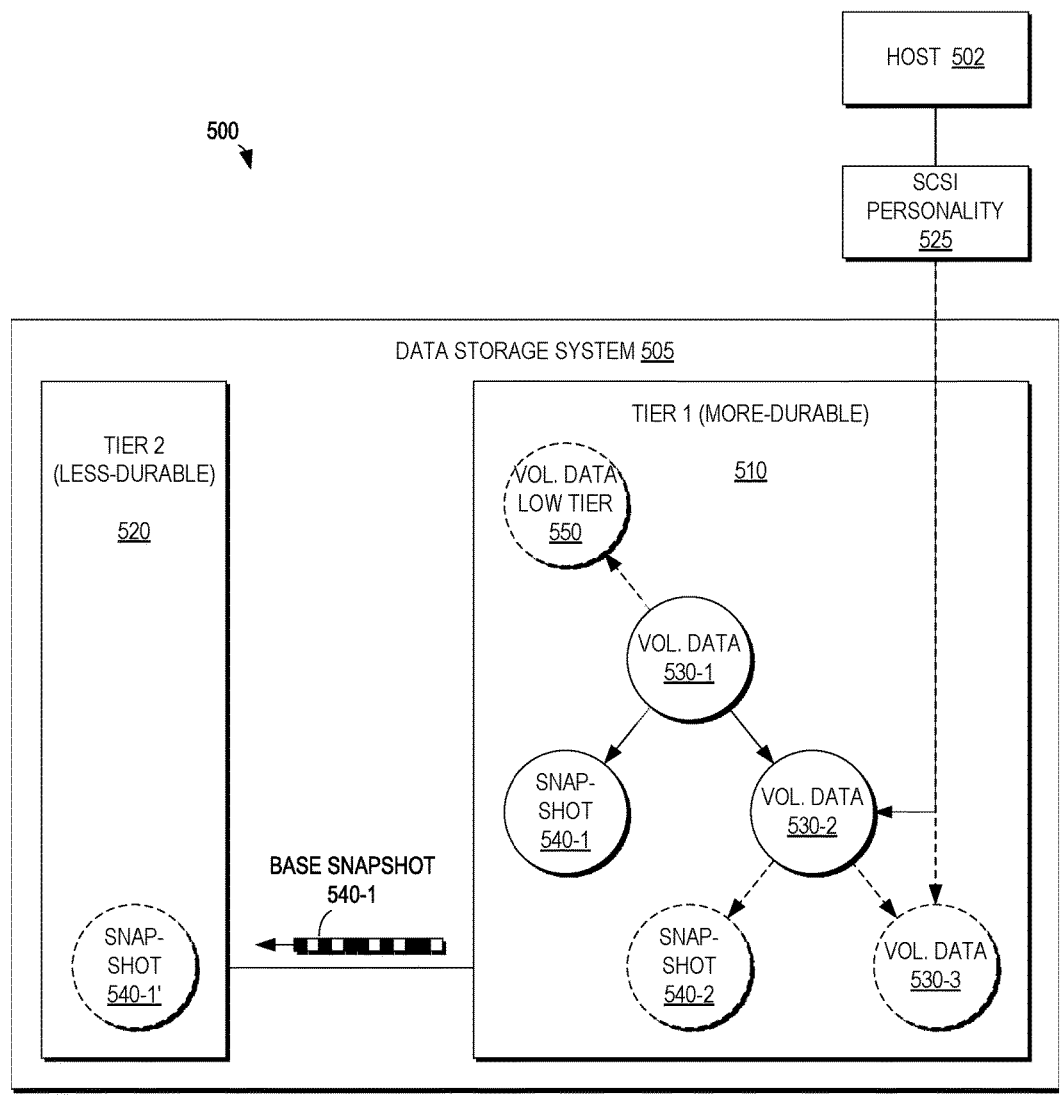
FIG. 5 is a block diagram illustrating a system for tiering a snapshot from a first, more-durable tier to a second, less-durable tier according to an example embodiment of the present invention.

FIG. 5 is a block diagram illustrating a system 500 for tiering a snapshot from a first, more-durable tier 510 to a second, less-durable tier 520 according to an example embodiment of the present invention. The data storage system 505 may be communicatively coupled to a host 502 and may store a volume represented as a tree of nodes (e.g., volume data nodes 530-1, 530-2, 530-3 (530 generally) and snapshot nodes 540-1, 540-2 (540 generally)).

The volume data is represented as a series of nodes 530 each containing the differences from its parent data node 530. When creating a snapshot, a new volume data node 530 is created that is initially empty, as described in U.S. Pat. No. 9,141,290 entitled "SNAPSHOT MECHANISM" and assigned to EMC Corporation of Hopkinton, Mass., the teachings of which patent are incorporated herein by reference in their entirety.

The host 502 may access the volume data nodes 530 according to a Small Computer System Interface (SCSI) personality 525 visible to the host 502 and linked to a current volume data node 530 to enable access to a point in time. The SCSI personality 525 may be moved to other volume data nodes 530 in the tree. In other words, the first, more-durable tier 510 maintains a tree of volume data nodes 530 and snapshots 540, where every node in the tree represents the differences between that node and the node's parent. When a user chooses to access a given point-in-time, a "snap and reassign" operation is performed on the selected snapshot and the application host can now access the device.

For simplicity, the following description will describe only one volume; however, it should be understood that the methods described herein are equally applicable to data storage systems 100 storing a plurality of volumes.

As illustrated in FIG. 5, in an initial state, there are volume data nodes 530-1, 530-2 with the SCSI personality 525 pointing to the latest (second) volume data node 530-2. Further, there is a first snapshot 540-1 representing the volume at a first point. The first, more-durable tier 510 may create a second snapshot 540-2 from the volume data node 530-2 representing the volume at a second point in time and create a third volume data node 530-3 from the second volume data node 530-2 and move the SCSI personality 525 from the parent (second) volume data node 530-2 to the child (third) volume data node 530-3. It should be understood that the first, more-durable tier 510 may create new snapshots periodically (e.g., daily, x hours, etc.).

Accordingly, when the first, more-durable tier 510 creates the snapshot 540-2 of the second volume data node 530-2 (i.e., device), there are two entities created: (1) a snapshot 540-2 which is a version of the volume data 530-2 (i.e., a writable snapshot that points to the volume), and (2) a third volume data node 530-3 which is assigned the SCSI personality 525. Therefore, the third volume data node 530-3 can get new changes (i.e., writes) to the volume 530 which now becomes fixed (i.e., when a snapshot is taken, the child (third) volume data node 530-3 is created and the parent (second) volume data node 530-2 becomes fixed with no more changes). It should be understood that the parent (second) volume data node 530-2 is the same as the data in the second snapshot 540-2 before and input/output (I/O) operations are performed on it. The child (third) volume data node 530-3 is assigned the SCSI personality so it receives the I/Os from the host 502.

A copy data management (CDM) manager, such as AppSync®, or a replication mechanism such as EMC RecoverPoint®, both by EMC Corporation of Hopkinton, Mass., can provide visibility for the data storage system 505 into the lifecycle of the base snapshot 540-1. For example, CDM functions may indicate to the data storage system 505 that the base snapshot 540-1 is a weekly snapshot and will not be erased for at least one week and, therefore, may be moved to the second, less-durable tier 520 because it will not be overwritten for an extended period of time (i.e., at least one week).

As illustrated in FIG. 5, data in a base snapshot 540-1 may be moved to a lower tier based on a user indication or a system indication that the snapshot 540-1 will be stored for a certain period of time. For example, the first, more-durable tier 510 may ship the base snapshot 540-1 to the second, less durable tier 520 to be stored 540-1' at the second, less durable tier 520. Once the base snapshot 540-1 is shipped to the second, less durable tier 520, the data storage system 505 may delete the base snapshot 540-1 data from the first, more-durable tier 510 and record metadata indicating that the data of the base snapshot 540-1 data has been tiered 540-1' to the second, less durable tier 520. In certain embodiments, the data storage system 505 may store the tiering metadata in a low tier pointer data structure 550 that, for example, contains pointers for deleted data that is stored in the second, less-durable tier 520.

Tiering snapshots, such as to a Data Domain® data protection device by EMC Corporation of Hopkinton, Mass., is described in greater detail in U.S. patent application Ser. No. 15/086,577 (EMC-15-0959) entitled "METHOD AND SYSTEM FOR LEVERAGING SECONDARY STORAGE FOR PRIMARY STORAGE SNAPSHOTS" filed on even date herewith and assigned to EMC Corporation of Hopkinton, Mass., the teachings of which application are hereby incorporated herein by reference in their entirety.

Figure 7:
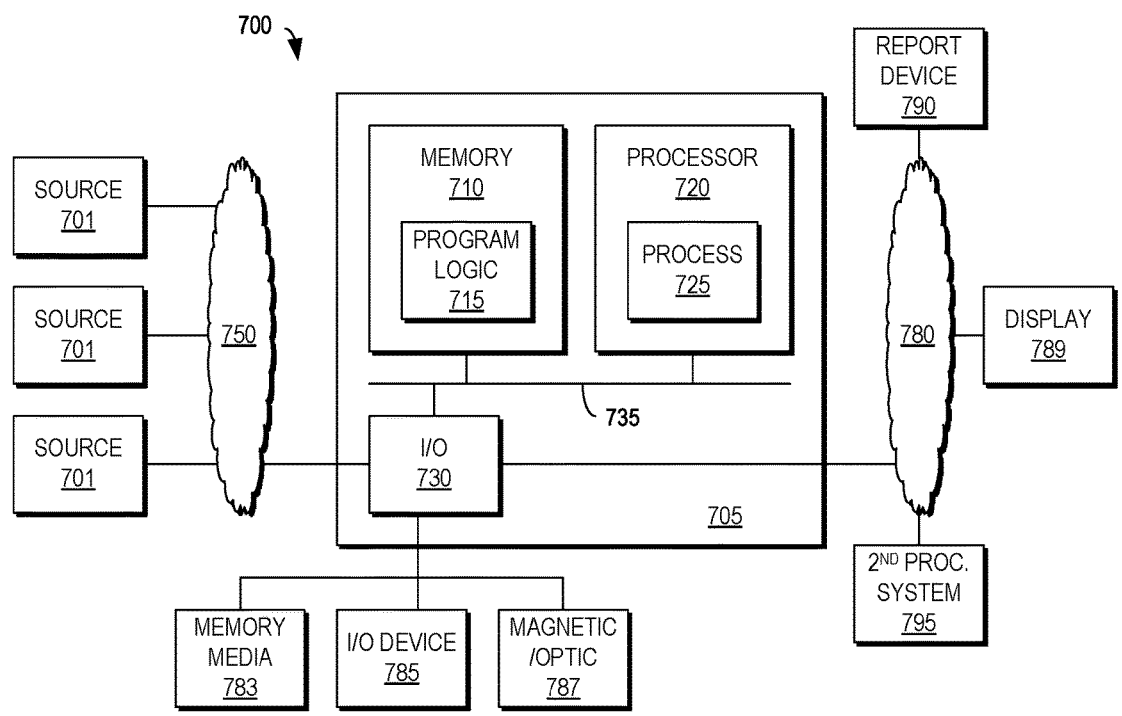
FIG. 7 is a block diagram of an apparatus according to an example embodiment of the present invention.

FIG. 7 is a block diagram of an example embodiment apparatus 705 according to the present invention. The apparatus 705 may be part of a system 700 and includes memory 710 storing program logic 715, a processor 720 for executing a process 725, and a communications I/O interface 730, connected via a bus 735.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 8:
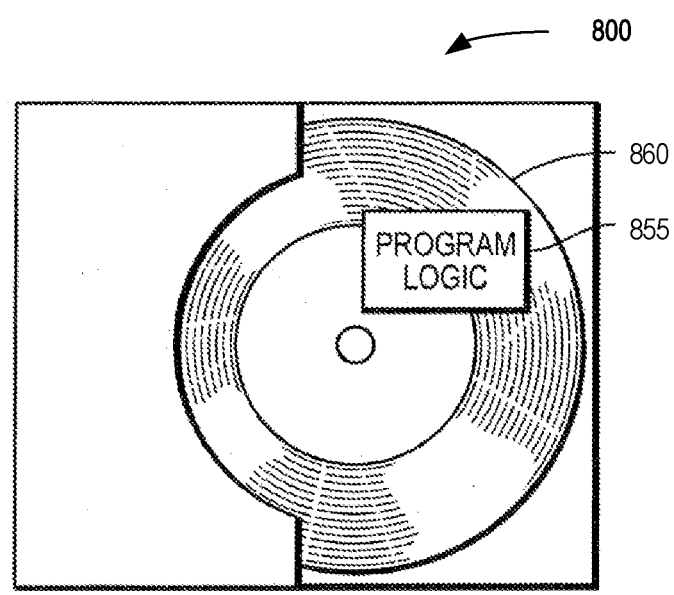
FIG. 8 is an illustration of an example embodiment of the present invention as embodied in computer program code.

FIG. 8 is a block diagram of a computer program product 800 including program logic 855, encoded on a computer-readable medium 860 in computer-executable code configured for carrying out the methods of the invention, according to an example embodiment of the present invention. The logic for carrying out the method may be embodied as part of the aforementioned system, which is useful for carrying out a method described with reference to embodiments shown.

Various exemplary embodiments of the present disclosure have been described with reference to the accompanying drawings. It should be noted that all of these drawings and description are only presented as exemplary embodiments. It is to note that based on the subsequent description, alternative embodiments may be conceived that may have a structure and method disclosed as herein, and such alternative embodiments may be used without departing from the principle of the disclosure as claimed in the present disclosure.

It may be appreciated that these exemplary embodiments are provided only for enabling those skilled in the art to better understand and then further implement the present disclosure, not intended to limit the scope of the present disclosure in any manner. Besides, in the drawings, for a purpose of illustration, optional steps, modules, and units are illustrated in dotted-line blocks.

The terms "comprise(s)," "include(s)", their derivatives and like expressions used herein should be understood to be open, i.e., "comprising/including, but not limited to." The term "based on" means "at least in part based on." The term "one embodiment" means "at least one embodiment"; and the term "another embodiment" indicates "at least one further embodiment." Relevant definitions of other terms will be provided in the description below.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
    maintaining data in a data storage system having a plurality of tiers, the data storage system including a plurality of volumes with each volume having a mapping table, the mapping table includes: (a) addresses each pointing to a page of data and (b) a reference count indicating a number of times a specific page of data is referenced in the volumes, further wherein the data storage system includes a metadata table having a last write time metadata for each of the addresses in the mapping table;
    determining a subset of the data stored in a first, more-durable tier should be stored in a second, less-durable tier, wherein the first, more-durable tier comprises a first all flash storage array, and the second less-durable comprises a second all flash storage array, further wherein the second all flash storage array includes a lower write durability than the first all flash storage array, wherein the determining includes determining the subset of the data from data in a stripe which was previously more than half full, but is currently at least half empty, and determining the subset of the data based on (i) the reference count associated with the subset of the data, and (ii) the last write time metadata associated with the subset of the data; and
    tiering the subset of the data from the first, more-durable tier to the second, less-durable tier.

2. The method of claim 1 wherein tiering the subset of the data from the first, more-durable tier to the second, less-durable tier comprises tiering the subset of the data to less expensive flash storage devices comprising the second, less-durable tier.

3. The method of claim 1 wherein determining a subset of the data stored in a first, more-durable tier should be stored in a second, less-durable tier comprises determining the subset of the data has a high fragmentation value.

4. The method of claim 1
    wherein the subset of the data is a data block; and
    wherein determining the data block stored in a first, more-durable tier should be stored in a second, less-durable tier comprises determining the data block was last written to at least an amount of time in the past satisfying a policy.

5. The method of claim 1
    wherein the subset of the data is a range of data blocks; and
    wherein determining the range of data blocks stored in a first, more-durable tier should be stored in a second, less-durable tier comprises determining all of the data blocks in the range of data blocks were last written to at least an amount of time in the past satisfying a policy.

6. The method of claim 1
    wherein the subset of the data is a base snapshot; and
    wherein determining the base snapshot stored in a first, more-durable tier should be stored in a second, less-durable tier comprises determining a lifecycle of the base snapshot as satisfying a policy according to at least one of continuous data protection and a replication engine.

7. The method of claim 1 wherein tiering the subset of the data from the first, more-durable tier to the second, less-durable tier comprises:
    receiving a write operation for the subset of the data directed to the first, more-durable tier; and
    redirecting the write operation for the subset of the data to the second, less-durable tier.

8. The method of claim 1 further comprising:
    monitoring a utilization of the data storage system associated with read I/Os to the data storage system directed to data stored in the second, less-durable tier;
    balancing an allocation of data storage system resources across servicing the read I/Os to the data storage system directed to data stored in the second, less-durable tier and write I/Os to the second, less-durable tier associated with the tiering of the subset of the data from the first, more-durable tier to the second, less-durable tier.

9. The method of claim 8 wherein balancing an allocation of data storage system resources across servicing the read I/Os to the data storage system directed to data stored in the second, less-durable tier and write I/Os to the second, less-durable tier associated with the tiering of the subset of the data from the first, more-durable tier to the second, less-durable tier comprises throttling the write I/Os to the second, less-durable tier associated with tiering the subset of the data from the first, more-durable tier to the second, less-durable tier in favor of servicing the read I/Os to the data storage system directed to data stored in the second, less-durable tier of the data storage system.

10. A data storage system comprising:
a first, more-durable tier;
a second, less-durable tier; and
memory storing computer program code that when executed on a processor of the data storage system causes the data storage system to perform the operations of:
maintaining data in the data storage system, the data storage system including a plurality of volumes with each volume having a mapping table, the mapping table includes: (a) addresses each pointing to a page of data and (b) a reference count indicating a number of times a specific page of data is referenced in the volumes, further wherein the data storage system includes a metadata table having a last write time metadata for each of the addresses in the mapping table;
determining a subset of the data having a high value stored in the first, more-durable tier should be stored in a second, less-durable tier, wherein the first, more-durable tier comprises a first all flash storage array, and the second less-durable comprises a second all flash storage array, further wherein the second all flash storage array includes a lower write durability than the first all flash storage array, wherein the determining includes determining the subset of the data from data in a stripe which was previously more than half full, but is currently at least half empty, and determining the subset of the data based on (i) the reference count associated with the subset of the data, and (ii) the last write time metadata associated with the subset of the data; and
tiering the subset of the data having a high value from the first, more-durable tier to the second, less-durable tier.

11. The system of claim 10 wherein computer program code operable to perform the operation of determining a subset of the data stored in a first, more-durable tier should be stored in a second, less-durable tier comprises computer program code operable to perform the operation of determining the subset of the data has a high deduplication ratio.

12. The system of claim 10 wherein computer program code operable to perform the operation of determining a subset of the data stored in a first, more-durable tier should be stored in a second, less-durable tier comprises computer program code operable to perform the operation of determining the subset of the data has a high fragmentation value.

13. The system of claim 10
wherein the subset of the data is a data block; and
wherein computer program code operable to perform the operation of determining the data block stored in a first, more-durable tier should be stored in a second, less-durable tier comprises computer program code operable to perform the operation of determining the data block was last written to at least an amount of time in the past satisfying a policy.

14. The system of claim 10
wherein the subset of the data is a range of data blocks; and
wherein computer program code operable to perform the operation of determining the range of data blocks stored in a first, more-durable tier should be stored in a second, less-durable tier comprises computer program code operable to perform the operation of determining all of the data blocks in the range of data blocks were last written to at least an amount of time in the past satisfying a policy.

15. The system of claim 10
wherein the subset of the data is a base snapshot; and
wherein computer program code operable to perform the operation of determining the base snapshot stored in a first, more-durable tier should be stored in a second, less-durable tier comprises computer program code operable to perform the operation of determining a lifecycle of the base snapshot as satisfying a policy.

16. The system of claim 10 wherein computer program code operable to perform the operation of tiering the subset of the data from the first, more-durable tier to the second, less-durable tier comprises computer program code operable to perform the operations of:
receiving a write operation for the subset of the data directed to the first, more-durable tier; and
redirecting the write operation for the subset of the data to the second, less-durable tier.

17. The system of claim 10 further comprising computer program code operable to perform the operations of:
monitoring a utilization of the data storage system associated with read I/Os to the data storage system directed to data stored in the second, less-durable tier;
balancing an allocation of data storage system resources across servicing the read I/Os to the data storage system directed to data stored in the second, less-durable tier and write I/Os to the second, less-durable tier associated with the tiering of the subset of the data from the first, more-durable tier to the second, less-durable tier.

18. The system of claim 17 wherein computer program code operable to perform the operation of balancing an allocation of data storage system resources across servicing the read I/Os to the data storage system directed to data stored in the second, less-durable tier and write I/Os to the second, less-durable tier associated with the tiering of the subset of the data from the first, more-durable tier to the second, less-durable tier comprises computer program code operable to perform the operation of throttling the write I/Os to the second, less-durable tier associated with tiering the subset of the data from the first, more-durable tier to the second, less-durable tier in favor of servicing the read I/Os to the data storage system directed to data stored in the second, less-durable tier of the data storage system.

19. A computer program product including a non-transitory computer readable storage medium having computer program code encoded thereon that when executed on a processor of a computer causes the computer to execute a tiering controller process, the computer program code comprising:
computer program code for maintaining data in a data storage system having a plurality of tiers, the data storage system including a plurality of volumes with each volume having a mapping table, the mapping table includes: (a) addresses each pointing to a page of data and (b) reference count indicating a number of times a specific page of data is referenced in the volumes, further wherein the data storage system includes a metadata table having a last write time metadata for each of the addresses in the mapping tablet;

computer program code for determining a subset of the data stored in a first, more-durable tier should be stored in a second, less-durable tier, wherein the first, more-durable tier comprises a first all flash storage array, and the second less-durable comprises a second all flash storage array, further wherein the second all flash storage array includes a lower write durability than the first all flash storage array, wherein the determining includes determining the subset of the data from data in a stripe which was previously more than half full, but is currently at least half empty, and determining the subset of the data based on (i) the reference count associated with the subset of the data, and (ii) the last write time metadata associated with the subset of the data; and computer program code for tiering the subset of the data from the first, more-durable tier to the second, less-durable tier.

\* \* \* \* \*